Patented Nov. 4, 1924.

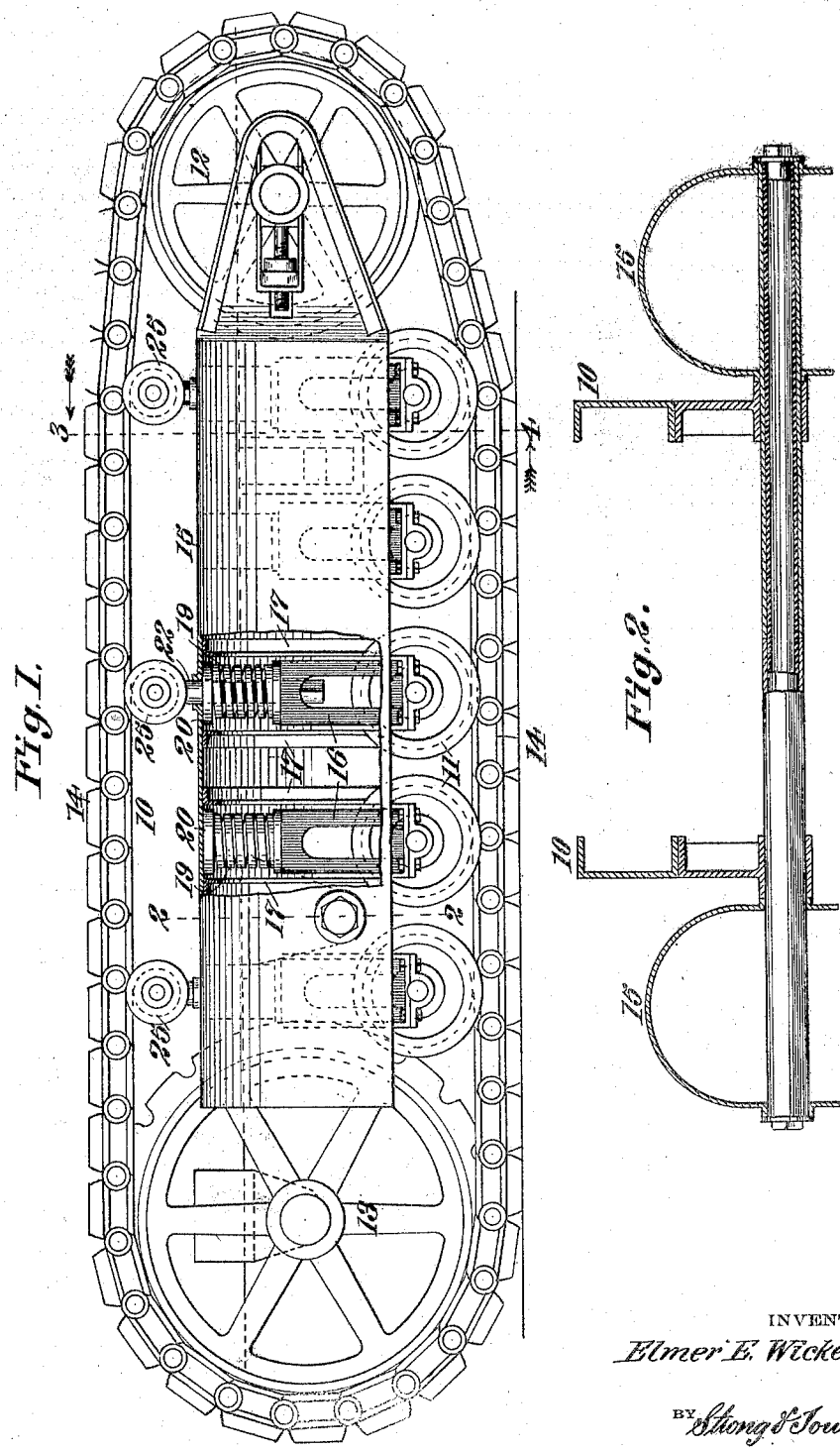

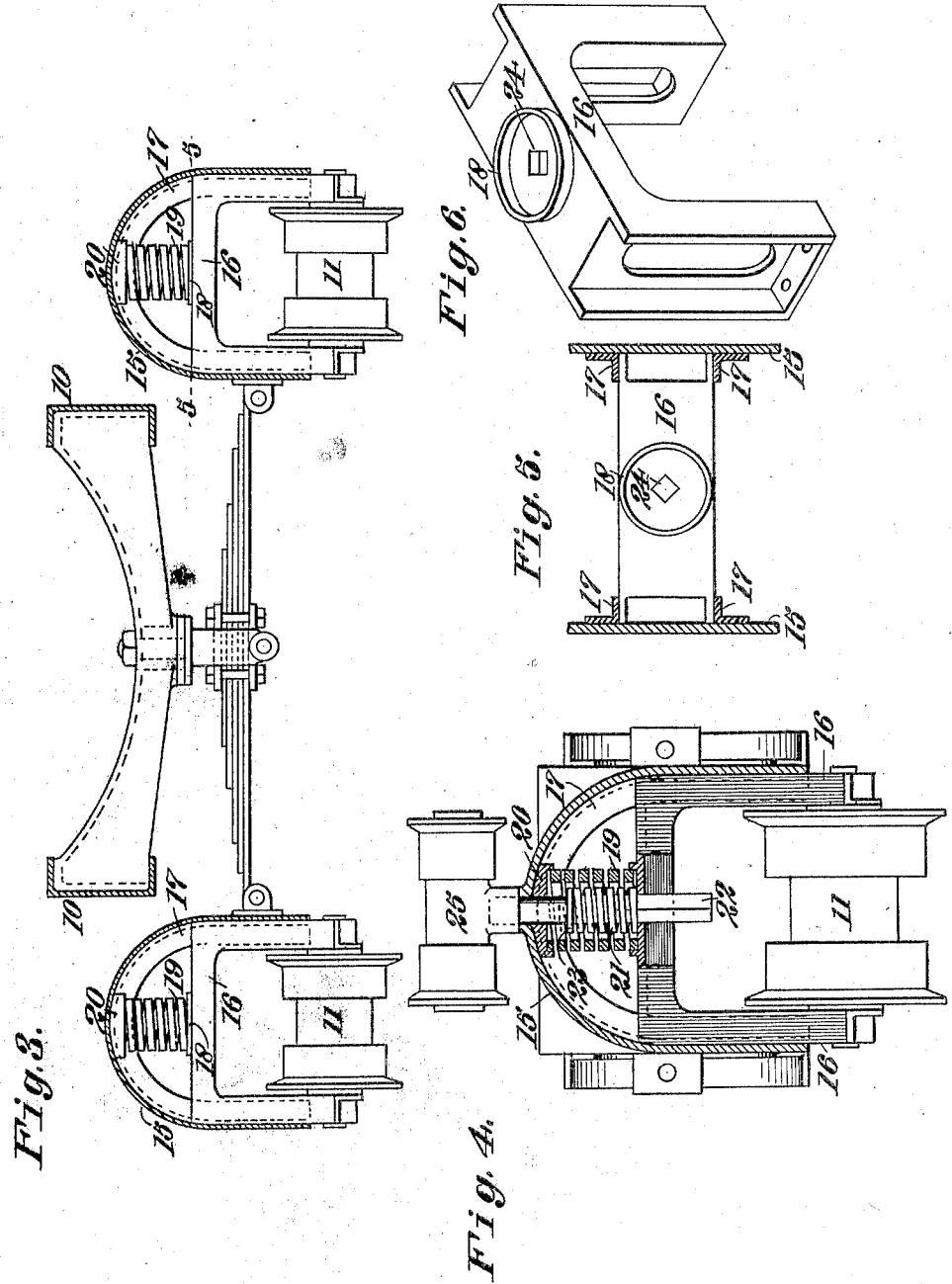

1,514,187

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SPRING-MOUNTED TRUCK AND CARRIER ROLLERS.

Application filed September 3, 1919. Serial No. 321,396.

*To all whom it may concern:*

Be it known that I, ELMER E. WICKERSHAM, a citizen of the United States, residing at Stockton, in the county of San Joaquin and State of California, have invented new and useful Improvements in Spring-Mounted Truck and Carrier Rollers, of which the following is a specification.

This invention relates to tractors of the chain track type and more particularly to a novel mounting for the truck rollers thereof.

It has for its object to cushion the truck frame on the supporting rollers and also to provide spring supports for the rollers which guide and support the upper run of track.

In the present case I make use of a novel arrangement which permits both supporting and carrier rollers to be spring mounted and thereby I provide not only cushions for the truck frame but also spring-pressed supports for the upper run of the track, whereby any slack occurring in the track, such as might be caused by yielding of the supporting rollers will be taken up.

Referring to the accompanying drawings:

Fig. 1 shows a side elevation of the tractor truck mechanism embodying my invention.

Fig. 2 shows a sectional view taken on line 2—2 of Fig. 1.

Fig. 3 shows a cross section of opposite truck mechanisms in connected position, supporting a main frame.

Fig. 4 shows a cross section of a truck mechanism taken on line 3—4 of Fig. 1 and looking forwardly.

Fig. 5 shows a sectional view taken on line 5—5 of Fig. 3.

Fig. 6 shows a detached view in perspective of one of the supports for the rollers.

In the form illustrated herewith, a main frame 10 is carried upon tractor truck mechanisms, one unit being arranged at each side. This mechanism comprises a truck frame on which is journaled a series of supporting rollers 11, at the forward end of which is carried an idler sprocket wheel 12. A toothed sprocket wheel 13 is journaled upon the main frame and the chain track 14 is carried by the sprocket wheels and passes beneath the rollers 11, forming a track for the latter. The form of truck frame employed herein is made of an inverted U-shaped frame member 15 and the rollers are carried thereby on a yoke-shaped member 16 slidably mounted within the truck frame member and guided and held in place therein by means of vertically extending ribs or rails 17. The transverse portion of the yoke member 16 has a seat 18 formed thereon to receive an extensible coil spring 19 which engages at its upper end with a seat 20 formed on the inside of the frame member 15. Thereby the weight of the truck mechanism is supported wholly upon the springs 19 and since each roller is separately connected, the said rollers are free to yield independently.

Within each alternate spring 19, which is of appreciable diameter, there is arranged a smaller coil spring 21 coiled about a rod 22 and pressing with an upward force against a plate 23 fixed upon said rod. The rod is slidably mounted in the truck frame member 15 and extends downwardly through an opening 24 in the adjacent yoke 16. Fixed upon the upper end of each rod is a roller 25 which engages the upper run of the track and serves as a support therefor. The spring 21 acts as a cushion for the roller 25 and is so adjusted as to exert an upward force on the rod 22 and thereby maintain the track under a constant tension.

In the operation of the tractor, it will be seen that the rollers 11 are free to yield in a vertical direction, compressing the springs 19. This provides a cushion for the truck mechanism, whereby all shocks and jolts caused by irregularities in the surface of the road are absorbed. If desired, the main frame may be mounted upon the truck mechanism without the usual spring connections hitherto employed for cushioning the main frame.

It will also be seen that the spring action of the carrier rollers 25 will serve to maintain the chain track under constant tension and take up any slack occurring therein, such as results from wear of the track or as would occur when one of the supporting rollers 11 is depressed.

By the present arrangement of spring supports for the supporting and carrier rollers, it will be noted that when one of the supporting rollers is moved upwardly, the spring 23 will be compressed and thereby will act with increased force to move the connected carrier roller 25 upwardly and thus the slack occurring in the track, due to the upward movement of the supporting roller, will immediately be taken up by the carrier roller overhead.

Various changes in the construction and arrangement of the several parts herein shown and described may be resorted to without departing from the spirit of my invention as disclosed in the appended claims.

Having thus described my invention, what I claim and desire to secure by Letters Patent is—

1. In a tractor truck mechanism of the self-laying track type, a truck frame formed in the shape of an inverted U, a series of supporting rollers for the truck frame, a yoke for each roller slidably mounted between the side plates of the truck frame and movable vertically therein, a spring interposed between the top of the truck frame and the transverse portion of the yoke for supporting said truck frame yieldingly upon the rollers, a series of rollers for supporting the upper run of the track, a support for each roller extending downwardly through the top of the truck frame and slidable therein, and a spring for said slidable support arranged within one of the first-mentioned springs and acting upon said support to press the latter upwardly, whereby to exert a yielding force against the upper run of the track and maintain the latter taut.

2. In a tractor truck mechanism of the self-laying track type, a truck frame, a chain track surrounding the same, a series of rollers on the lower portion of the truck frame to support it with relation to the chain track, spring cushioning means interposed between the rollers and the frame to permit the rollers to yield independently in passing over obstructions, a second series of rollers on the upper portion of the truck frame, and spring cushioning means interposed between said second series of rollers and the truck frame, whereby to exert a yielding force against the upper portion of the chain track to maintain the same taut.

In testimony whereof I have hereunto set my hand in the presence of two subscribing witnesses.

ELMER E. WICKERSHAM.

Witnesses:
CHARLES L. NEUMILLER,
DAVID B. LYMAN.